Patented Feb. 7, 1933								1,896,159

UNITED STATES PATENT OFFICE

WILLIAM S. CALCOTT, OF PENNS GROVE, NEW JERSEY, AND ALBERT S. CARTER, OF WILMINGTON, DELAWARE, ASSIGNORS TO E. I. DU PONT DE NEMOURS & COMPANY, OF WILMINGTON, DELAWARE, A CORPORATION OF DELAWARE

HALOGENATING ACETYLENE POLYMERS

No Drawing.			Application filed January 11, 1930. Serial No. 420,275.

This invention relates to a new and useful class of organic compounds, especially derivatives of acetylene polymers and the process of their production. In particular the chlorine derivatives of these polymers are contemplated.

Prior art

It is known that by passing acetylene into a mixture of ammonium chloride, water, cuprous chloride and copper powder of suitable proportions and under proper conditions, unsaturated hydrocarbons of higher molecular weight are formed. These hydrocarbons may be separated by distillation from the reaction mixture. The product is a low-boiling (80–85° C.) highly unsaturated liquid. This liquid is apparently made up of a number of constituents, apparently having the general formula $C_xH_x$. The major constituent is called divinylacetylene and most probably has the empirical formula $C_6H_6$. Others formed in appreciable proportions, which may be mentioned, are believed to have the formulæ $C_8H_8$ and $C_4H_4$. These products in turn may be roughly separated by distillation.

It is also known that the crude mixture, any one of its constituents or mixtures of the various constituents may be polymerized in various ways, for instance, by aging at ordinary temperatures. The polymerization is greatly accelerated at elevated temperatures, and is known to take place either in the presence of oxygen or inert gases, as nitrogen. In the presence of oxygen, the polymerizing material will absorb oxygen with the development of compounds having explosive properties. Therefore, if it is desired to carry out the polymerization in an oxygen environment and at the same time produce a material free from chemically combined oxygen some method for inhibiting oxidation must be employed. One successful method already disclosed is to incorporate into the material to be polymerized a substance which will prevent oxygen absorption.

As the polymerization proceeds regardless of the method employed, the material passes successively to an oily, then to a gelatinous, then to a resinous mass, and finally yields a hard, brittle resinous material having unusual resistance to the action of water and to organic solvents. The oily product which is first formed is largely soluble in alcohol and acetone; the gelatinous body next formed is largely soluble in acetone but only partially soluble in alcohol; the resinous modification is substantially insoluble in alcohol and is to a slight extent soluble in acetone; the final, hard, brittle polymers are substantially insoluble in both alcohol and acetone. These successive polymerization products apparently consist of a group of compounds in various stages of polymerization and they may be only roughly separated by dissolving. They may be successfully separated by distillation.

If the polymerization is stopped in the initial stages, the oily liquid polymer obtained may be separated from the volatile unpolymerized material by distillation. The resultant residue is a non-volatile substance having the general properties of a bodied drying oil. It has been shown that this drying oil may be used in the manufacture of paints or other coating compositions. It may be mixed with the solvents, pigments, fillers, etc., commonly employed in the preparation of coating compositions.

The example following illustrates the preparation from acetylene of the polymerizable polymer by the known method referred to above.

Example A 945 parts by weight of ammonium chloride, 1000 parts by weight of water, 2850 parts by weight of cuprous chloride, and 100 parts by weight of copper powder, are mixed and this mixture thoroughly agitated while passing into it acetylene gas. When the reaction slows up, as shown by a decrease in the rate of absorption of acetylene, the operation is discontinued, and the highly unsaturated hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass. As already stated, the resultant material contains a number of polymers the most abundant of which is believed to be divinylacetylene and to have the formula

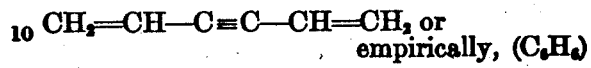

Other polymers produced in appreciable quantities are believed to have the formulæ: $C_8H_8$ and $C_4H_4$. These products may be roughly separated by distillation.

As illustrative of the partial polymerization by a known method of the material obtained in Example A, the following example is furnished.

*Example B*

1000 grams of pure divinylacetylene obtained from the product of Example A by distillation is boiled at atmospheric pressure and in the presence of air for four hours in a vessel provided with a condenser for the return of the condensed vapors to the reaction. The temperature of the boiling liquid is between 89° and 90° C. At the end of four hours the unchanged divinylacetylene is distilled off under reduced pressure. There remains, in 12 to 18% yield, a viscous non-volatile residue having the general properties of a bodied drying oil and consisting of the polymerized divinylacetylene.

The above examples, it will be understood, merely illustrate the preparation of the already known materials and are not a part of the present invention. It will be understood that any one of the first-step polymers or a mixture thereof may be polymerized similarly to the divinylacetylene of Example B and that the polymerization, instead of being discontinued at the oily stage as described in Example B, may be continued to any of the successive stages of partial polymerization described above or to obtain a solid polymer as the final product.

*Object of invention*

Owing to their high degree of unsaturation, the characteristic behavior of the polymerizable acetylene polymers, as prepared by the methods described above, is to rapidly absorb oxygen and also to undergo further polymerization. It is the object of this invention to utilize the high degree of unsaturation to form from such polymers, other than by polymerization alone, more stable compounds, which compounds will have a decreased tendency to oxidize and polymerize and will themselves be valuable or will constitute valuable intermediates for the preparation of numerous useful and novel compounds.

*Description of invention*

The objects are accomplished by the introduction of halogen at one or more of the unsaturated links of the acetylene polymer molecule, such operation being accomplished by the addition of the halogen alone or aided through the means of a catalyst. In either case, with any of the above described polymerizable acetylene polymers, we obtain a product which is less unsaturated and therefore more stable and which contains halogen in addition to carbon and hydrogen. In addition, the boiling point and viscosity of the polymers is appreciably raised by the chlorination.

It has been found that these acetylene polymers react readily with free chlorine, iodine or bromine, and that any one or a mixture of the polymers may be reacted directly with the halogen. The polymer may or may not be in solution as desired. Where a solution is used a solvent which does not react with halogen, for example, carbon tetra-chloride ($CCl_4$), chloroform ($CHCl_3$), acetylene tetra-chloride ($CHCl_2CHCl_2$), and the like, should be used.

Ordinarily the polymers treated will be the liquid polymers themselves or the liquid or polymerizable solid polymers in solution but this limitation is not imposed by the chemical nature of the compound itself but by the physical state, it being obvious that a solid does not present sufficient surface for the absorption of chlorine to proceed expeditiously.

The invention will be readily understood from consideration of the following examples which it will be understood are furnished merely by way of illustration.

*Example 1*

100 parts by weight of the unpolymerized acetylene polymer, thought to be divinylacetylene and obtained from the mixture prepared as described in Example A, are dissolved in an equal weight of cold carbon tetrachloride; the mixture is cooled to 20° C. and gaseous chlorine is passed through a porous porcelain gas distributor into it. Maintaining the temperature between 20° and 30° C., the addition of chlorine is continued until 270 parts have been absorbed. The yellow viscous solution may be used as such or it may be purified by well known methods. The major constituent of the product distills with decomposition with an apparent boiling point of 145–150° at a pressure equivalent to 12 mm. of mercury; it is thought most probably to have the formula $C_6H_6Cl_6$, probably 1, 2, 3, 4, 5, 6-hexachloro-hexene-3.

A similar product is obtained when another inert solvent as, for example, 1.1.2.2.- tetrachlorethane is employed as the solvent instead of carbon tetrachloride.

Example 2

100 parts by weight of the crude acetylene polymer mixture obtained as described in Example A are dissolved in carbon tetrachloride and treated with chlorine as in Example 1. This time, however, the temperature is allowed to rise to 80° after 50 parts of chlorine have been absorbed, while all vapors volatilized from the system are condensed and returned. This process is continued until chlorine is absorbed up to approximately 270 parts. After the removal of the solvent, the chlorinated product so formed cannot be distilled; it is a thick viscous oil of density greater than water and is thought to be a mixture of chlorinated hydrocarbons of the general formula $(C_2H_2)_x$ resulting, in this case, from simultaneous polymerization and chlorination.

A similar product is obtained when another inert solvent as, for example, 1.1.2.2. tetrachlorethane is employed as the solvent instead of carbon tetrachloride.

Example 3

100 parts by weight of the crude acetylene polymers, as obtained in Example A, are dissolved in carbon tetrachloride together with .5% iodine as a catalyst, and treated with chlorine as in Example 2, the temperature being allowed to rise to 80° after 50 parts of chlorine have been absorbed while all vapors volatilized from the system are condensed and returned. This process is continued until chlorine is absorbed up to approximately 270 parts. After the removal of the solvent, the chlorinated product so formed cannot be distilled; it is a thick viscous oil of density greater than water and is thought to be a mixture of chlorinated hydrocarbons of the general formula $(C_2H_2)_x$ described above, resulting in this case from simultaneous polymerization and chlorination. The presence of the catalyst has the effect of speeding up the reaction in the latter stages.

Example 4

25 gms. of separated divinylacetylene boiling at about 82° C. were treated with gaseous chlorine, as in Example 1 but in the absence of a solvent, for two hours in the cold (about 20° to 30° C.). Measurements showed that 6 gms. of chlorine had been absorbed in this period. The resulting oily liquid showed a boiling point substantially in excess of 82° C. and a notable increase in viscosity and specific gravity. It contains about 24% of chlorine.

Example 5

25 gms. of separated divinylacetylene were treated with gaseous chlorine under the conditions of Example 4 for two hours in the presence of .5% iodine as a catalyst. Measurements showed that during this time 8 gms. of chlorine had been absorbed as compared to 6 gms. in Example 4.

The results of this example illustrate clearly the accelerating effect of a catalyst. The product was similar in general properties to that of Example 4 but of slightly higher viscosity.

Example 6

100 parts of the non-volatile liquid acetylene polymer, obtained as described in Example B hereinabove, were dissolved in an equal weight of carbon tetrachloride and while held at 20° C. were treated with gaseous chlorine, as in Example 1, until 91 parts of chlorine had been absorbed. The resulting product is a non-volatile oil with an apparent formula $(C_6H_6Cl_2)_x$ and may be obtained in the free state by distilling off the carbon tetrachloride. It contains about 1 part of the polymer to 0.9 parts of Cl by weight. A comparison of the resulting product with the original polymer shows that the degree of unsaturation, as determined by further halogenation or hydrogenation, has been decreased. Similarly, the tendency to absorb oxygen is notably less although the material still has the general properties of a drying oil.

Example 7

The resinous semi-solid product obtained by heating the product described in Example A for approximately 7 hours at a temperature of 85° C. in an atmosphere of nitrogen was poured into 3 volumes of alcohol. The insoluble polymer which precipitates is extracted in carbon tetrachloride and the soluble portion chlorinated as in Example 6. When the carbon tetrachloride is removed by distillation, a semi-solid mass is obtained less unsaturated and resisting oxidation to a greater degree than the original precipitated polymer. It contains Cl in about the same amount as the product of Example 6.

Although in the above examples chlorine is employed as the halogen, it will be understood that iodine and bromine may be likewise employed. The use of chlorine, however, represents the preferred embodiment.

Similarly, although the chlorine, in the examples, is passed into the polymer in gaseous form and this is the preferred method, the chlorine obviously may be added in other ways, for example, in the form of a solution in the solvent for the polymer. The invention therefore is not limited to any particular method of chlorinating.

It will be evident from the above examples that the chlorination is preferably carried out at temperatures between 10° and 80° C. Lower temperatures while they may be employed are not practical due to the slowness of the reaction. Higher temperatures, also, may be employed but at such temperatures there is danger of the reaction proceeding at such a rapid rate that it becomes uncontrollable.

When chlorination is effected at temperatures between 10° and 20° C. the reaction is apparently primarily an addition resulting in derivatives which are still unsaturated. In such cases the chlorine apparently enters the molecule only at the unsaturated bonds as witnessed by the fact that there is no evidence of hydrochloride in the reaction mixture.

However, as the temperature rises above 20° C. there is an increasing tendency for polymerization to take place simultaneously with the chlorination. When chlorination is effected at temperatures above 35° C., as a result of such polymerization, the viscosity of the final product is appreciably greater than when chlorination is effected below 20° C. Also, within the higher temperature ranges substitution or replacement of hydrogen atoms by chlorine atoms in the molecule of the acetylene polymer appears to take place to a slight extent.

The reaction with chlorine causes the evolution of heat and therefore, if it is desired to avoid polymerization and substitution, temperature control is necessary. To this end a cooling system is useful. Alternately the addition of the halogen may be carried out at so slow a rate that the heat will be radiated as rapidly as evolved. It has been found, also, that the use of an inert solvent decreases the difficulties of cooling and prevents violent and uncontrollable reactions.

In many instances, however, it may be desirable to simultaneously polymerize and chlorinate. In such instances, of course, it will be necessary only to avoid such an increase in temperature as to avoid uncontrollable reactions. The products resulting are substantially the same as regards their physical properties as those obtained by chlorination at low temperatures of the correspondingly polymerized acetylene polymers. The fact that some substitution of hydrogen has taken place will not materially affect the properties of the product.

It will be evident therefore that the temperatures must be regulated in accordance with the viscosity and degree of saturation of the initial product as compared to the product desired. The addition of the chlorine, as already noted, imparts stability to the polymer and resistance to further polymerization and to oxidation. The resulting compounds, which are still unsaturated, will still polymerize and absorb oxygen, but at a relatively lower rate than the original polymer. The chlorination also, of course, raises the specific gravity and boiling point of the material treated. The viscosity of the treated material also is increased.

While the examples given above are of necessity restricted to the addition of chlorine in certain quantities, it will be clear therefrom that the chlorine may be theoretically reacted with the polymer in any proportion desired up to about 3.6 parts by weight of Cl to 1 part of the polymer. The introduction of chlorine in amounts exceeding about 3 parts of Cl by weight to one part of the polymer, however, is attended with practical difficulties and for most purposes a product containing from 0.24 to 2.7 parts of Cl to 1 part of the polymer is preferred.

As indicated in Examples 3 and 5, it has been found that "carriers" or halogenation catalysts such as iron, mercury, sulfur, mercuric oxide, iodine, bromine, ferric chloride, ferrous chloride and aluminum chloride may be used to promote the addition of chlorine, but at the same time in some cases they appear to promote substitution and in some cases, as for example aluminum chloride, polymerization is increased. The presence of a small amount of oxygen in the treated polymer has been found to also assist in the chlorination operation.

The materials produced by this invention may be used as drying oils for paints, as adhesives, as plastic or semi-plastic hot and cold moulding materials, as dyestuffs intermediates and by reason of their unusual stability are especially adapted for use as linings and coatings for vessels exposed to active chemical reagents. The degree of polymerization and chlorination will, of course, be determined by the contemplated use.

It will be understood that the products are of complex chemical constitution and that it is impossible to state with any degree of finality what is their chemical constitution.

As many apparent and widely different embodiments of this invention may be made without departing from the spirit and scope thereof, it is to be understood that we do not limit ourselves to the specific embodiments thereof except as defined in the appended claims.

We claim:

1. As a new compound, a halogen derivative of an unsaturated non-benzenoid acetylene polymer, said derivative being obtainable by direct addition of the halogen.

2. As a new compound, a chlorine derivative of an unsaturated non-benzenoid acetylene polymer, said derivative being obtainable by direct addition of chlorine and containing chlorine in such amount that the weight of the chlorine is not in excess of 3 times the original weight of the polymer.

3. As a new compound, a chlorine derivative of a non-benzenoid liquid acetylene polymer, said derivative being obtainable by direct addition of chlorine and containing chlorine in such amount that the weight of the chlorine is not in excess of 3 times the original weight of the polymer.

4. As a new compound, a chlorine derivative of a non-benzenoid liquid acetylene polymer, said derivative being obtainable by direct addition of chlorine and containing chlorine in such amount that the weight of the chlorine is substantially 2.7 times the weight of the original polymer.

5. As a new compound, a chlorine derivative of a hydrocarbon of the class consisting of divinylacetylene and its polymers, said derivative being obtainable by direct addition of the chlorine.

6. As a new compound, a chlorine derivative of a hydrocarbon of the class consisting of divinylacetylene and its polymers, said derivative being obtainable by direct addition of chlorine and containing chlorine in such amount that the weight of the chlorine is between 0.24 and 2.7 times the original weight of the polymer.

7. As a new compound, the product obtained by reacting divinylacetylene with 2.7 times its weight of chlorine at a temperature between 10° and 80° C.

8. As a new compound, the product obtained by reacting a solution of divinylacetylene with 2.7 times its weight of chlorine at a temperature between 10° and 20° C. and in the presence of a catalyst for the reaction.

9. The process which comprises reacting a non-benzenoid polymer of acetylene with halogen.

10. The process which comprises reacting a non-benzenoid polymer of acetylene with chlorine at a temperature between 10° and 80° C.

11. The process of claim 10 in which the reaction is carried out in the presence of a halogenation catalyst.

12. The process which comprises halogenating a non-benzenoid polymerizable liquid acetylene polymer at a temperature between 10° and 80° C.

13. The process which comprises reacting a non-benzenoid polymerizable liquid polymer of acetylene with not over 3.0 times its weight of chlorine at a temperature between 10° and 80° C.

14. The process which comprises reacting a non-benzenoid polymerizable liquid polymer of acetylene with 2.7 times its weight of chlorine at a temperature between 10° and 35° C.

15. The process which comprises reacting a non-benzenoid polymerizable liquid acetylene polymer with 2.7 times its weight of chlorine at a temperature between 10° and 20° C.

16. The process of claim 13 in which the reaction is carried out in the presence of a solvent for the acetylene polymer.

17. The pocess of claim 13 in which the reaction is carried out in the presence of a solvent for the acetylene polymer and a halogenating catalyst.

18. The process which comprises reacting divinylacetylene with chlorine.

19. The process which comprises reacting divinylacetylene with from 0.24 to 2.7 times its weight of chlorine at a temperature between 10° and 80° C.

20. The process which comprises reacting divinylacetylene with 2.7 times its weight of gaseous chlorine at a temperature between 10° and 20° C. and in the presence of a solvent for divinylacetylene and a halogenation catalyst.

In testimony whereof we affix our signatures.

WILLIAM S. CALCOTT.
ALBERT S. CARTER.